United States Patent [19]
Ohsawa et al.

[11] Patent Number: 6,122,451
[45] Date of Patent: Sep. 19, 2000

[54] SETTING APPARATUS FOR CAMERA

[75] Inventors: Yutaka Ohsawa, Tokyo; Tadahisa Ohkura, Saitama, both of Japan

[73] Assignee: Asahi Kogaku Kogyo Kabushiki Kaisha, Tokyo, Japan

[21] Appl. No.: 09/198,457

[22] Filed: Nov. 24, 1998

[30] Foreign Application Priority Data

Nov. 26, 1997 [JP] Japan ................................ 9-325015

[51] Int. Cl.[7] ........................................ G03B 7/00
[52] U.S. Cl. ................ 396/212; 396/223; 396/246; 396/299
[58] Field of Search .................... 396/212, 223, 396/245, 246, 297, 299, 250

[56] References Cited

U.S. PATENT DOCUMENTS

| | | | |
|---|---|---|---|
| 3,526,181 | 9/1970 | Fahlenberg | 396/250 |
| 5,146,259 | 9/1992 | Kobayashi et al. | 396/64 |
| 5,602,616 | 2/1997 | Sato et al. | 396/238 |

*Primary Examiner*—W. B. Perkey
*Attorney, Agent, or Firm*—Greenblum & Bernstein, P.L.C.

[57] ABSTRACT

A setting apparatus for a camera includes a first switch having a plurality of stop positions; a second switch; and a shutter speed setting device which can select a desired shutter speed from a plurality of shutter speeds set at predetermined steps in accordance with the stop positions of the first switch. The shutter speed setting device can modify the shutter speed (which has been selected via the stop positions of the first switch) by a step smaller than the predetermined steps via the operation of the second switch.

31 Claims, 11 Drawing Sheets

SETTING APPARATUS FOR CAMERA

BACKGROUND OF THE INVENTION

1. Field of the Invention

The present invention relates to an apparatus for setting shutter speeds or diaphragm values in a camera.

2. Description of the Related Art

In recent single lens reflex cameras, setting apparatuses are being provided wherein the shutter speed or diaphragm values are set by a CPU. For instance, in a shutter device, a controllable shutter speed range is divided into a plurality of sections at predetermined steps, whereby the shutter speed can be set. The selection and change of the shutter speed are carried out by the operation of an electronic dial. The electronic dial is provided with two or more contacts; the CPU detects a signal which is issued in accordance with the connection or disconnection of these contacts. Therefore, there is theoretically no limitation to the number of set values which can be provided by the electronic dial. For example, it is possible to set the shutter speeds at a small step such as ½ step (0.5 Tv) or ⅓ step (0.33 Tv). Also, the amount of freedom in setting the precision and range is relatively extensive.

However, in such an electronic dial, the shutter speeds are set regardless of the absolute stop position of the electronic dial. Namely, the operator (user) cannot know the set value based on the stop position of the operation portion of the electronic dial which can be seen externally.

In a mechanical switch such as a rotary switch in which the shutter speeds are set based on the stop position of the operation portion thereof, the shutter speeds can be set at a click stop position of the operation portion. Hence, an operator (user) who sees the stop position of the operation portion set value can easily know the set value. However, in such a mechanical switch, it is difficult to increase the number of the click stop positions or contacts by a desired amount. Therefore, the shutter speeds can be set only at single-step units (Ev, Tv).

SUMMARY OF THE INVENTION

It is an object of the present invention to provide a setting apparatus for a camera, in which a desired shutter speed, selected by a first switch, can be recognized based on the position of the first switch; furthermore, the shutter speed can be set by a second switch for when the desired shutter speed cannot be set by the first switch.

Another object of the present invention is to provide a setting apparatus for a camera; wherein shutter speeds and the bulb, selected by a first switch, can be visually recognized based on the position of the first switch; and when the bulb is selected, slower shutter speeds (long exposure) can be selected by a second switch.

According to an aspect of the present invention, there is provided a setting apparatus for a camera which includes: a first switch having a plurality of stop positions; a second switch; and a shutter speed setting device which can select a desired shutter speed from a plurality of shutter speeds set at predetermined steps in accordance with the stop positions of the first switch. The shutter speed setting device can modify the shutter speed (which has been selected via the stop positions of the first switch) by a step smaller than the predetermined steps via the operation of the second switch.

Preferably, the first switch includes a rotary switch which can be selectively stopped at a plurality of click-stop positions, and wherein the shutter speed setting device detects the click-stop position of the rotary switch to thereby carry out the selection thereof in accordance with the detected click-stop position.

Preferably, the data selected and obtained at the click-stop position of the first switch is indicated on the operation portion of the first switch in a camera body.

Preferably, the second switch includes an up-switch which is adapted to modify and increase the shutter speed, and a down-switch which is adapted to modify and decrease the shutter speed.

Preferably, the shutter speed corresponding to the predetermined step is equivalent to the absolute value of 1 Ev; wherein the shutter speed corresponding to the smaller step can be equivalent to an absolute value of ½ Ev. Alternatively, the shutter speed corresponding to the smaller step can be equivalent to an absolute value of ⅓ Ev.

According to another aspect of the present invention, there is provided a setting apparatus for a camera which includes: a first switch having a plurality of stop positions; a second switch; and a shutter speed setting device which can select a shutter speed or a bulb from a plurality of shutter speeds set at predetermined steps in accordance with the stop positions of the first switch. The shutter speed setting device can set a shutter speed slower than the shutter speed instead of the bulb, the bulb having been selected via the stop positions of the first switch, via the operation of the second switch.

Preferably, the first switch includes a rotary switch which can be selectively stopped at a plurality of click-stop positions, and wherein the shutter speed setting device detects the click-stop position of the rotary switch to thereby carry out the selection thereof in accordance with the detected click-stop position.

Preferably, the data selected and obtained at the click-stop position of the first switch is indicated on the operation portion of the first switch in a camera body.

Preferably, the second switch includes an up-switch which is adapted to modify and increase the shutter speed, and a down-switch which is adapted to modify and decrease the shutter speed.

Preferably, the shutter speed corresponding to the predetermined step is equivalent to the absolute value of 1 Ev; wherein the shutter speed corresponding to the smaller step can be equivalent to an absolute value of ½ Ev. Alternatively, the shutter speed corresponding to the smaller step can be equivalent to an absolute value of ⅓ Ev.

Alternatively, according to another aspect of the present invention, there is provided a setting apparatus for a camera which includes: a first switch having a plurality of stop positions; a second switch; and a shutter speed setting device for selecting a shutter speed or a bulb from a plurality of shutter speeds set at a predetermined step in accordance with the stop positions of the first switch. The shutter speed setting device can modify the shutter speed (which has been selected via the stop positions of the first switch) by a step smaller than the predetermined steps via the operation of the second switch. The shutter speed setting device can set a shutter speed slower than the shutter speed instead of the bulb, the bulb having been selected via the stop positions of the first switch, via the operation of the second switch.

Preferably, the first switch includes a rotary switch which can be selectively stopped at a plurality of click-stop positions, and wherein the shutter speed setting device detects the click-stop position of the rotary switch to thereby carry out the selection thereof in accordance with the detected click-stop position.

Preferably, the data selected and obtained at the click-stop position of the first switch is indicated on the operation portion of the first switch in a camera body.

Preferably, the second switch includes an up-switch which is adapted to modify and increase the shutter speed, and a down-switch which is adapted to modify and decrease the shutter speed.

Preferably, the shutter speed corresponding to the predetermined step is equivalent to the absolute value of 1 Ev; wherein the shutter speed corresponding to the smaller step can be equivalent to an absolute value of ½ Ev. Alternatively, the shutter speed corresponding to the smaller step can be equivalent to an absolute value of ⅓ Ev.

According to another aspect of the present invention, there is provided setting apparatus for a camera which includes: a first switch having a plurality of stop positions; a second switch; and an exposure factor setting device which can select desired photographing conditions from a plurality of exposure factors in accordance with the stop positions of said first switch. The exposure factor setting device can modify the exposure factor, which has been selected via the stop positions of the first switch, by a step smaller than the predetermined steps via the operation of the second switch.

The present disclosure relates to subject matter contained in Japanese Patent Application No. 9-325015 (filed on Nov. 26, 1997) which is expressly incorporated herein by reference in its entirety.

BRIEF DESCRIPTION OF THE DRAWINGS

The invention will be described below in detail with reference to the accompanying drawings, wherein.

DESCRIPTION OF THE PREFERRED EMBODIMENT

Figure 1:
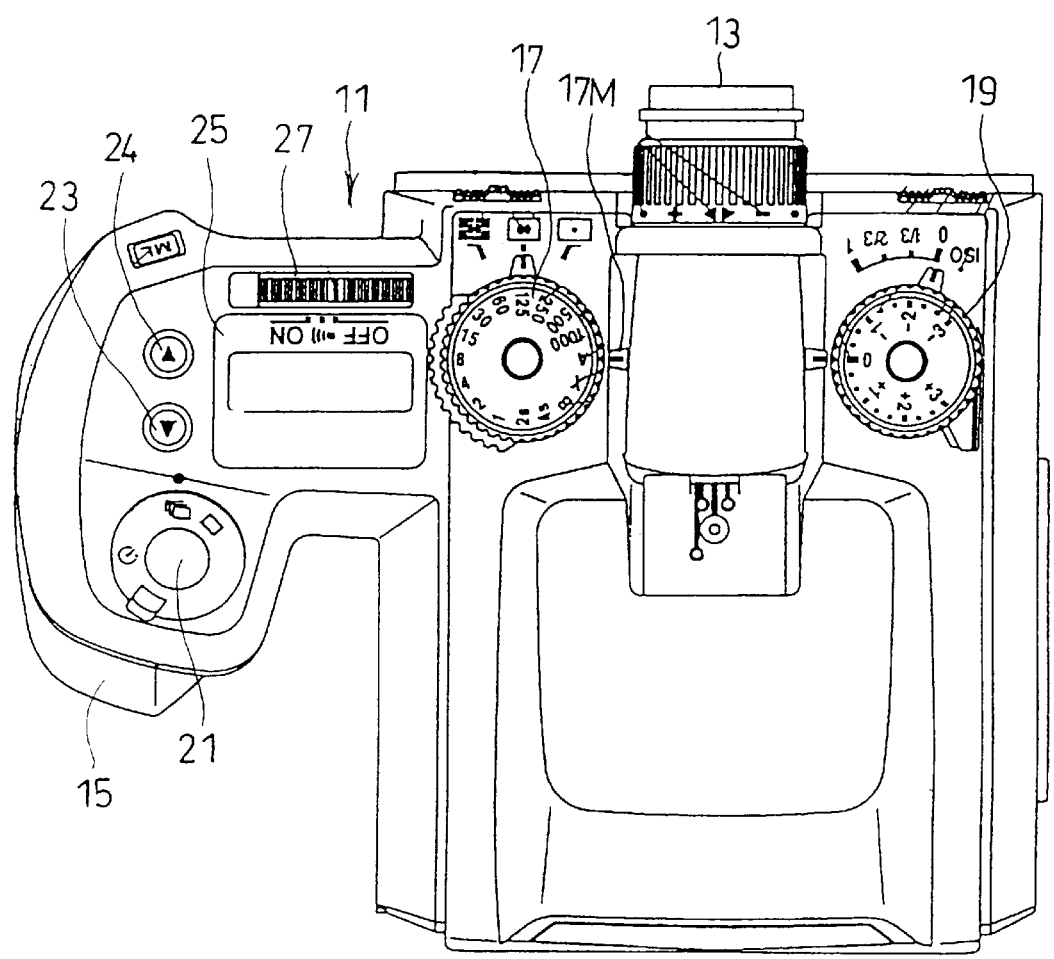
FIG. 1 is a plan view of an embodiment of the present invention applied to a medium-format single lens reflex camera.

FIG. 1 shows a plan view of an embodiment of the present invention applied to a medium-format single lens reflex camera.

A camera body 11 of a single lens reflex camera is provided on its upper surface on the grip portion 15 side, with respect to the eyepiece 13, with a shutter speed setting dial 17 as a first shutter device, and an exposure correction dial 19 on the opposite side of the eyepiece 13. On the upper surface of the grip portion 15 is provided a release button 21; an up-switch button 23 and a down switch button 24 constituting a second switch, in this order from the front (object side); a display 25 provided on one side of the up and down switches buttons 23 and 24; and a main slide-switch 27 provided behind the display 25.

The switch buttons 21, 23, 24 and slide-switch 27 are associated with a photometering switch SWS and a release switch SWR, an up-switch 59, a down-switch 60, and a main switch 63 (FIG. 2), respectively; so that when the buttons are depressed or the slide-switch 27 is slid, the corresponding switches are turned ON or OFF. The release button 21 is in the form of a push button switch which is depressed by a half-step to turn the photometering switch SWS ON, and is depressed by a full-step to turn the release switch SWR ON. The up-switch button 23 and the down-switch button 24 are in the form of push button switches which are depressed to turn on the up-switch 59 and the down-switch 60, respectively. The main slide-switch 27 is in the form of a sliding switch which is associated with the main switch 63, and is slidable to selectively move to a power-off position, a power-on position, and a power-on with alarm position.

The shutter speed setting dial 17 is associated with a rotary switch which can be selectively click-stopped at a plurality of angular positions wherein the shutter speeds and the shutter modes can be set in accordance with the click-stop positions. In the illustrated embodiment, in addition to a shutter speed manual-setting position in which the shutter speed (exposure times) can be set in single-step units (1 Ev, Tv) in the range of ¹/₁₀₀₀ second to 4 seconds; an automatic shutter speed setting-position, an X-contact position, and a bulb position are further provided as shutter modes. Shutter speed setting dial 17 is provided on the surface thereof with discrimination marks to discriminate the positions. The shutter speeds less than 1 second are represented by reciprocal numbers thereof. The automatic shutter speed, the X-contact position, and the bulb position are represented by "A", "X" and "B", respectively. When these marks are registered with an indication line 17M provided on the camera body, the corresponding shutter speeds and shutter modes are set. For instance, in FIG. 1, the mark "A" is registered with the indication line 17M, therefore the automatic shutter setting-mode is set.

Figure 2:
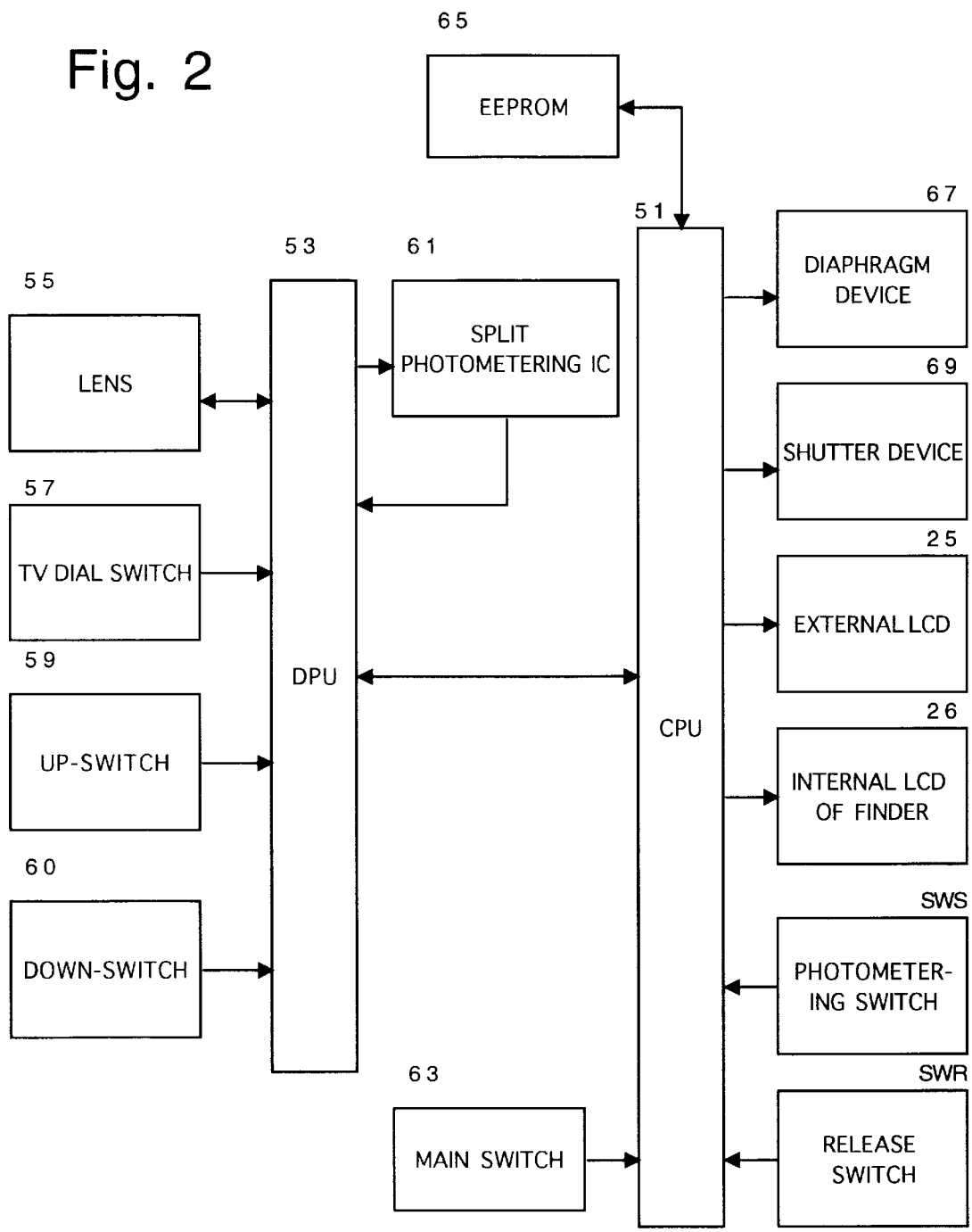
FIG. 2 is a block diagram of a main part of a control system for a single lens reflex camera shown in FIG. 1.

FIG. 2 shows a block diagram of the main part of a control system which controls the operation of the single lens reflex camera. In the illustrated embodiment, the control system includes, as a control device, a CPU 51 which generally controls the whole operation of the camera; and a DPU 53 which carries out lens communication and switch input. The CPU 51 and the DPU 53 communicate with each other. The DPU 53 transmits and receives data to and from the photographing lens 55; checks the ON/OFF operation of the Tv dial switch (shutter speed manual-setting switch) 57, the up-switch 59, and the down-switch 60; and inputs the photometering signal from a split photometering IC 61. The Tv dial switch 57 is associated with the shutter speed setting dial 17, and the up-switch 59 and the down-switch 60 are associated with the up switch button 23 and the down switch button 24, respectively.

Connected to the CPU 51 is the main switch 63 which turns the power source ON and OFF, photometering switch SWS and release switch SWR, and a EEPROM 65 as a memory in which parameters for setting the shutter speeds are stored. Furthermore, also connected to the CPU 51 is a diaphragm device 67 and a shutter device 69, as main components of the camera; and an external LCD 25 which indicates photographing data such as shutter speeds; and an LCD 26 within the finder. The main switch 63 is associated with the main switch button 27, and the photometering switch SWS and the release switch SWR are associated with the release button 21.

The CPU 51 checks the ON/OFF state of each switch to turn the power source ON and OFF in accordance with the ON/OFF state; performs the calculation of the exposure based on the photometering value input from the split photometering IC 61 and ISO speed data; indicates the set shutter speeds in the LCDs 25 and 26; controls the diaphragm device 67 and the shutter device 69 in accordance with the set diaphragm value and shutter speeds; and performs the releasing operation (exposure).

The Tv dial switch 57 can be a rotary switch or a disc encoder. In the case of a rotary switch being utilized, one or more movable contacts which can rotate together with the rotating shaft of the shutter speed setting dial 17 and a plurality of stationary contact pieces corresponding to the shutter speeds and the shutter speeds and shutter modes are provided. The DPU 53 detects whether the movable contact piece(s) is in contact with a stationary contact piece(s) due to a change in the voltage; thereby discriminating the shutter speeds, the automatic shutter speed setting-mode, the X-contact position and the bulb mode.

The operation of the single lens reflex camera will be discussed below with reference to the flow charts shown in the drawings. In order to clarify the significant features of the present invention, the flow charts are chiefly directed to the intermediate shutter speed setting operation and the bulb time setting operation.

Figure 3:
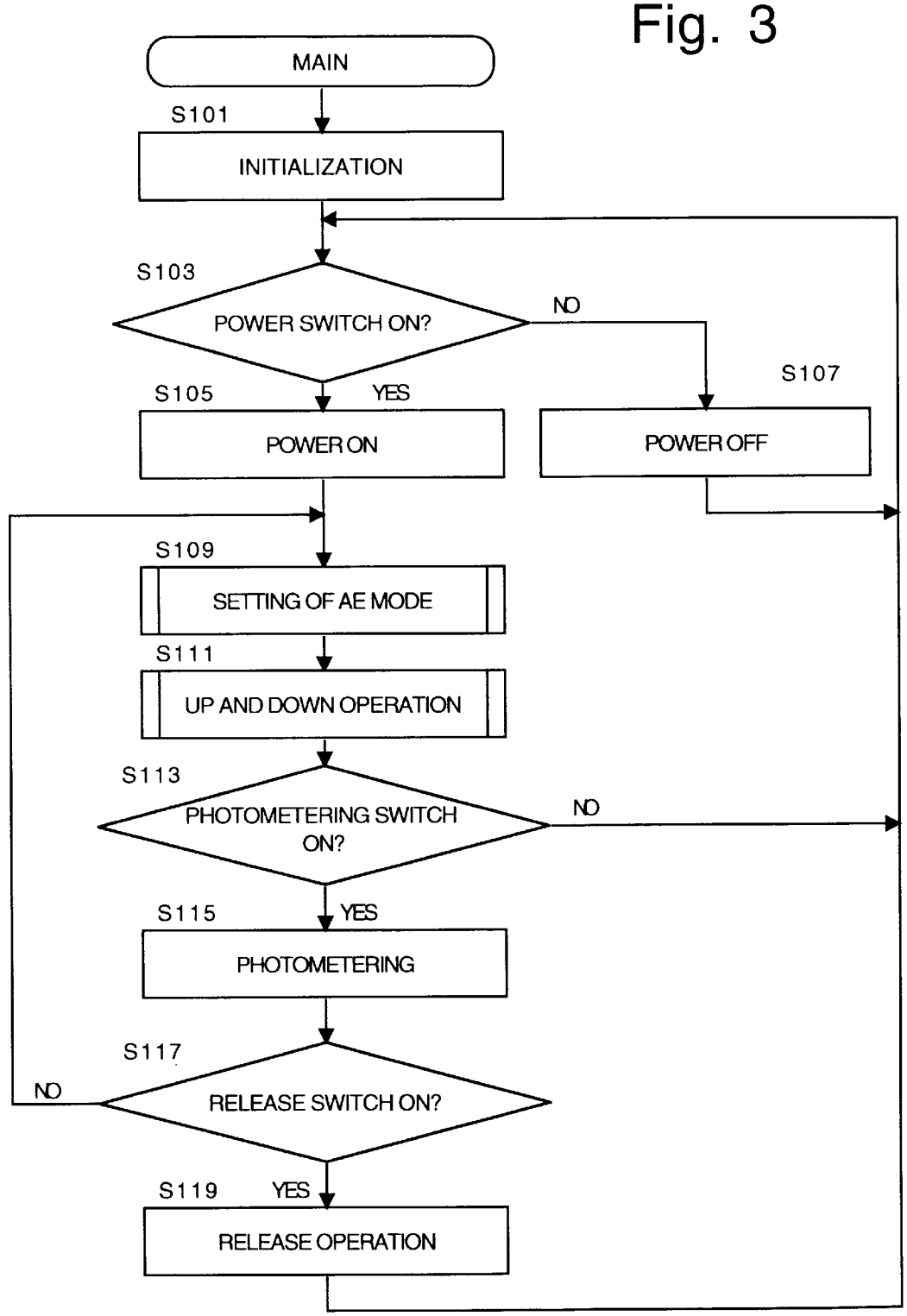
FIG. 3 shows a flow chart of a main operation of a single lens reflex camera shown in FIG. 1, by way of example.

FIG. 3 shows the main operation of the single lens reflex camera. This operation begins when a battery (not shown) is loaded in the camera body.

In this operation, the ports of the CPU 51 and the DPU 53 and the internal RAM are initialized (S101). A check is executed to determine whether or not the main switch 63 is turned ON. If the main switch is not ON, the power source for the CPU 51 is turned ON and the power source for other members is turned OFF. The control does not proceed until the main switch 63 is turned ON (S103, N; S107).

If the main switch 63 is turned ON, the power source for other members is turned ON; the AE mode setting operation is carried out to set an AE mode, and the data up/down operations are carried out in response to the operation of the up switch button and the down switch button (S103, Y; S105; S109; S111).

Subsequently, a check is made to determine whether or not the photometering switch SWS is ON. If the photometering switch SWS is not ON, the control is returned to step S103 (S113, N; S103). If the photometering switch SWS is turned ON, the photometering operation is carried out (S113, Y; S115). If the release switch SWR is turned ON, the diaphragm device 67 and the shutter device 69 are controlled to perform the release operation and thereafter, the control is returned to step S103 (S117, Y; S119; S103). If the release switch SWR is not turned ON, the control is returned to step S109 (S117, N; S109).

Figure 4:
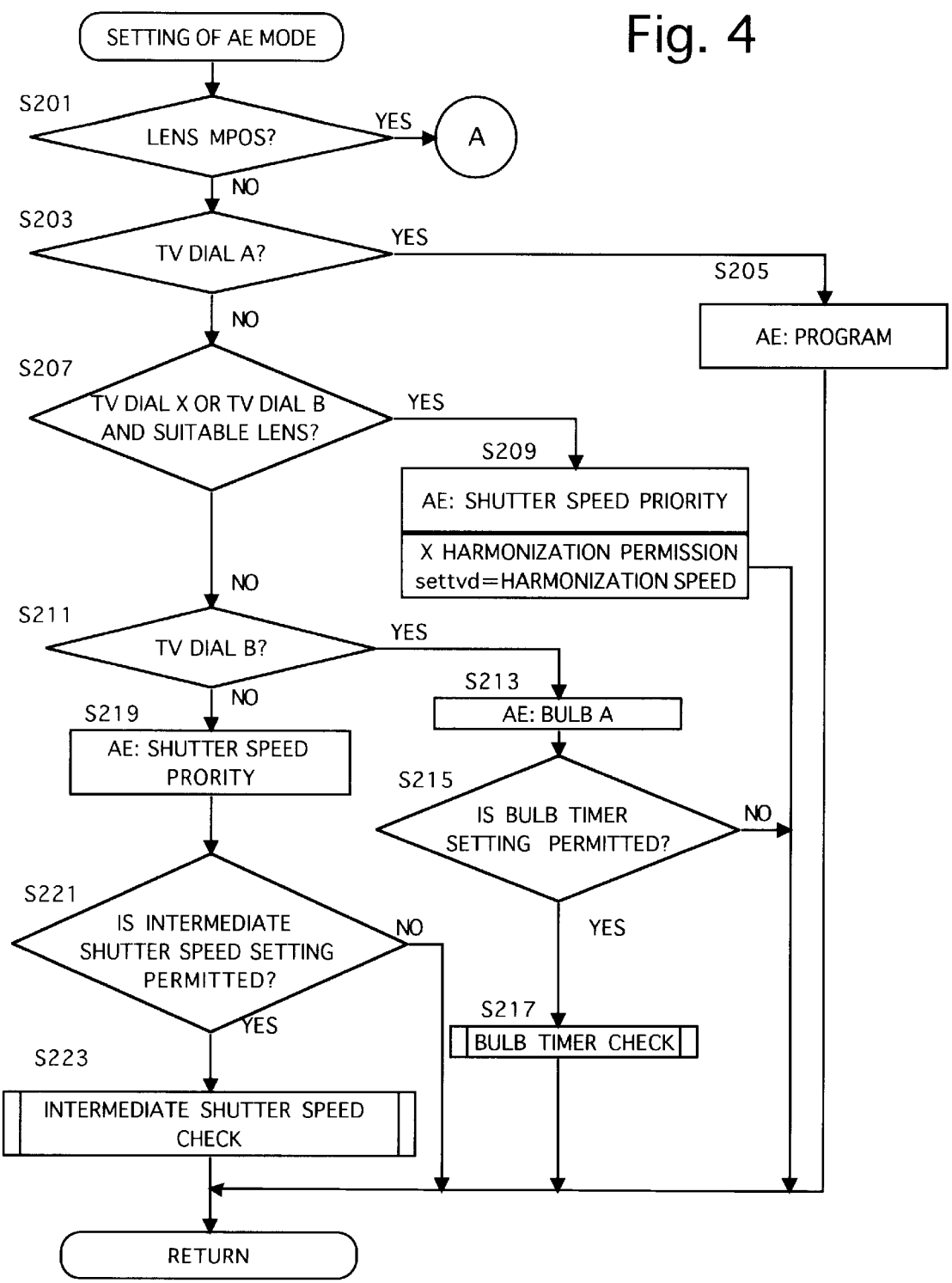
FIG. 4 shows a flow chart of an AE mode setting operation of a single lens reflex camera shown in FIG. 1, by way of example.
Figure 5:
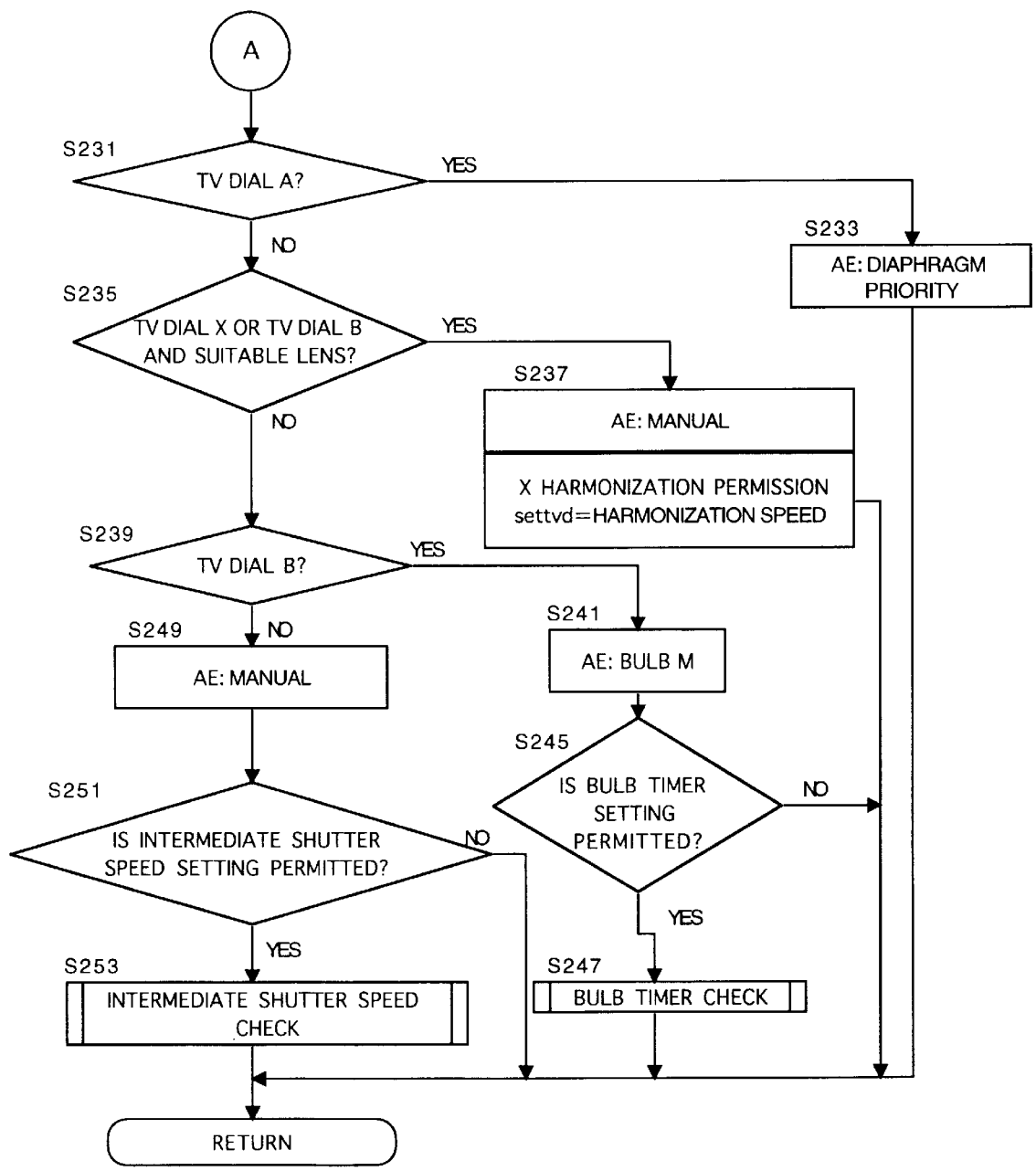
FIG. 5 shows a flow chart of an AE mode setting operation of a single lens reflex camera shown in FIG. 1, by way of example.

The AE mode setting operation at step S109 will be discussed below with reference to the flow charts shown in FIGS. 4 and 5. In the AE mode setting operation, the exposure mode is automatically set in accordance with the position of the shutter speed setting-dial 17.

When the control enters the routine for the AE mode setting operation, a check is made to determine whether or not the diaphragm of the photographing lens 55 is located at the manual position. If the diaphragm of the photographing lens 55 is located at the manual position, the control skips to step S231 (S201, Y; S231). If the diaphragm of the photographing lens 55 is not located at the manual position, i.e., is located at the auto position, the control proceeds to step S203 (S201, N; S203). At step S203, a check is made to determine whether the Tv dial switch 57 is located at the shutter auto position "A". If the Tv dial switch 57 is located at the shutter auto position "A", since the diaphragm auto mode and the shutter auto mode have been selected, the program exposure mode is set.

If the shutter speed setting-dial 17 is not located at the shutter auto position "A", a check is made to determine whether the shutter speed setting-dial 17 is located at the "X" contact position, or the bulb position "B" and whether the photographing lens is suitable for the bulb (S203, N; S207). If the shutter speed setting-dial 17 is located at the "X" contact position or the bulb position "B" or if the photographing lens is suitable for the bulb, the shutter speed priority mode is selected since the diaphragm auto and strobe mode or bulb mode is selected. Consequently, the strobe light emission in harmonization with the "X" contact is permitted. Thereafter, the set shutter speed settvd is set to be identical to the strobe harmonization speed and the control is returned (S207, Y; S209).

If the shutter speed setting-dial 17 is not located at the "X" contact position, the bulb position B, or if the photographing lens is not suitable for the bulb, a check is made to determine whether or not the shutter speed setting-dial dial 17 is located at the bulb position "B" (S207, N; S211). If the shutter speed setting-dial 17 is located at the bulb position B, the bulb exposure mode is selected. If the bulb timer setting is permitted, the bulb timer check operation is carried out (S211, Y; S213; S215; S217). If the bulb timer setting is not permitted, the control is directly returned (S215, N).

If the shutter speed setting-dial 17 is not in the bulb position B, i.e., if the shutter speed setting-dial 17 is in the shutter speed setting-position, since the automatic diaphragm mode and the manual shutter speed mode are set, the shutter speed priority exposure mode is selected (S211, N; S219). If the intermediate shutter speed setting is permitted, the intermediate shutter speed checking operation is carried out and the control is thereafter returned (S221, Y; S223). If an intermediate shutter speed setting is not permitted, the control is directly returned (S221, N).

Note that the permission or inhibition of the bulb timer setting, and the permission and inhibition of the intermediate shutter speed setting are stored in the EEPROM 65. This information is utilized for example upon delivery of the camera, or by a user using specific function switches (not shown).

If it is judged at step S201 to check the lens manual position M that the diaphragm is for the manual setting lens, the control proceeds to step S231 to check whether or not the shutter speed setting-dial 17 is in the shutter auto position "A". If the shutter speed setting-dial 17 is in the shutter auto position "A", since the diaphragm manual-setting mode and the shutter auto setting-mode are selected, the diaphragm priority exposure mode is selected and thereafter the control is returned (S231, Y; S233).

If the shutter speed setting-dial 17 is not located in the shutter auto position "A", a check is made to determine whether the shutter speed setting-dial 17 is in the "X"

contact position or in the bulb position "B" and whether the photographing lens is suitable for the bulb (S231, N; S235). If the shutter speed setting-dial 17 is in the "X" contact position or in the bulb position "B" and if the photographing lens is suitable for the bulb, since either the diaphragm manual setting-mode and the strobe harmonization mode are set, or the bulb mode is set, the manual exposure mode is selected; whereby the strobe emission in harmonization with the "X" contact can be permitted and the set shutter speed settvd is re-set to be the same as the strobe harmonization speed (S235, Y; S237). Thereafter, the control is returned.

If the shutter speed setting-dial 17 is not in the "X" contact position or in the bulb position "B" or if the photographing lens is not suitable for the bulb at step S235, a check is made to determine whether or not the shutter speed setting-dial 17 is in the bulb position "B" (S235, N; S239). If the shutter speed setting-dial 17 is in the bulb position "B", the bulb exposure mode M is selected; a check is made to determine whether the bulb timer setting is permitted. If the bulb timer setting is permitted, the bulb timer setting is carried out, and the bulb time is set (S239, Y; S241, Y; S245). Thereafter, the control is returned. If the bulb timer setting is not permitted, the control is directly returned (S245, N).

The bulb mode M refers to a mode in which the diaphragm is set to manual. The bulb mode A refers to a mode in which the diaphragm is set to automatic.

If the shutter speed setting-dial 17 is not in the bulb position B, i.e., if the shutter speed setting-dial 17 is in the shutter speed setting-position, since the diaphragm is set to manual and the shutter speed is set to manual, the manual exposure mode is selected (S235, N; S239, N; S249). If the intermediate shutter speed setting is permitted, the intermediate shutter speed is set, and the thereafter the control is returned (S251, Y; S253). If an intermediate shutter speed setting is not permitted, the control is directly returned (S251, N).

Figure 6:
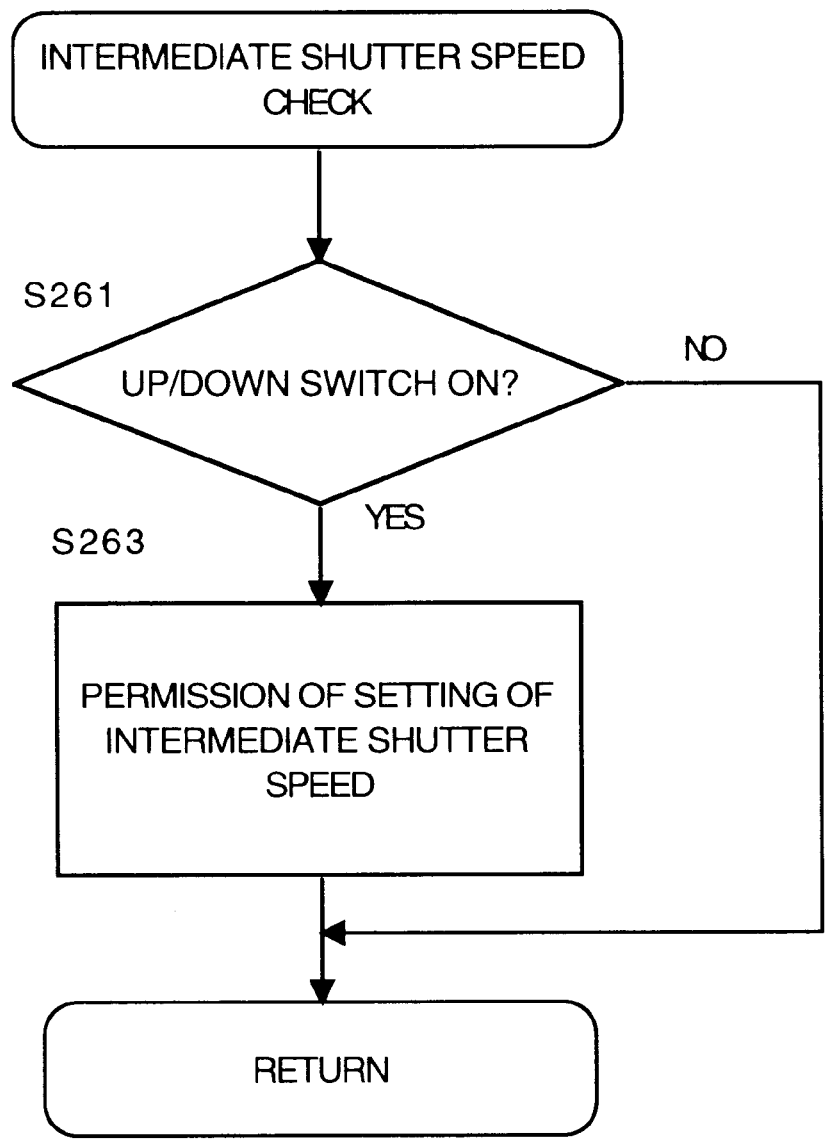
FIG. 6 shows a flow chart of an intermediate shutter checking operation of a single lens reflex camera shown in FIG. 1, by way of example.
Figure 7:
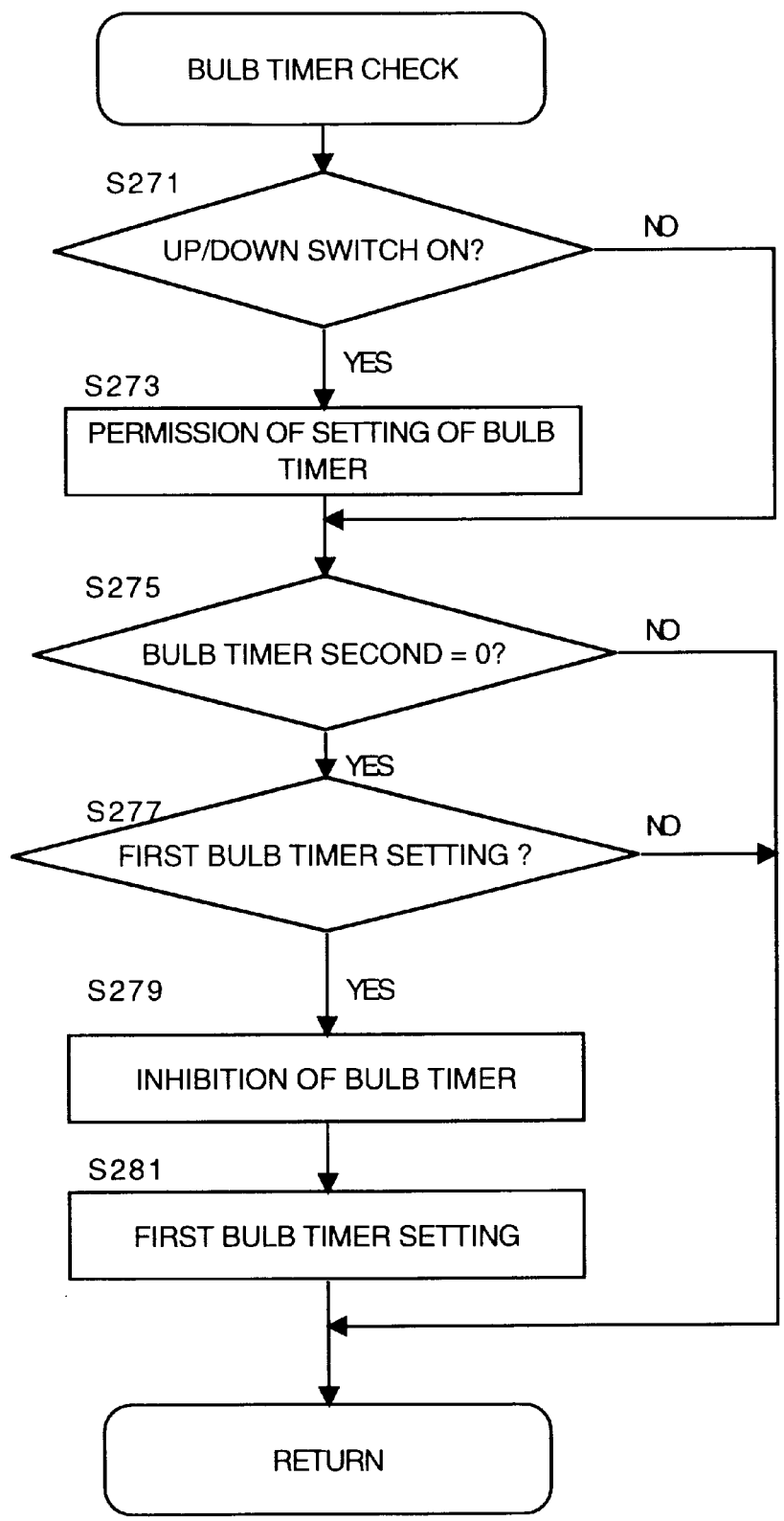
FIG. 7 shows a flow chart of a bulb timer checking operation of a single lens reflex camera shown in FIG. 1, by way of example.

The intermediate shutter speed checking operation and the bulb timer checking operation will be discussed below with reference to the flow charts shown in FIGS. 6 and 7.

In the intermediate shutter speed checking operation, a check is made to determine whether the up-switch 59 or the down-switch 60 is turned ON. If the up-switch 59 or the down-switch 60 is turned ON, an intermediate shutter speed setting is permitted and the control is returned (S261, Y; S263). If the up-switch 59 and the down-switch 60 are not turned ON, the control is directly returned (S261, N).

The bulb timer checking operation refers to an operation in which the normal bulb mode is set to open the shutter while the release switch SWR is ON in the initial state of the bulb timer mode.

In the bulb timer checking operation, a check is made to determine whether the up-switch 59 or the down-switch 60 is turned ON. If the up-switch 59 or the down-switch 60 is turned ON, the bulb timer setting is permitted and the control proceeds to step S275 (S271, Y; S273; S275). If the up-switch 59 and the down-switch 60 are not turned ON, the control proceeds to step S275 (S271, Y; S275).

At step S275, a check is made to determine whether the bulb timer (second) is set to 0. If the bulb timer is set at 0, a check is made to determine whether the bulb timer setting is the first setting. If the bulb timer setting is the first setting, the bulb timer is inhibited and the first bulb timer setting flag is set (S275, Y; S277, Y; S279; S281). If the bulb timer setting is not the first setting, the control is returned (S275, N; or S275, Y; S277, N) When the bulb timer is set to 0, this corresponds to the normal bulb mode in which the shutter is opened while the release switch SWR is ON.

Figure 8:
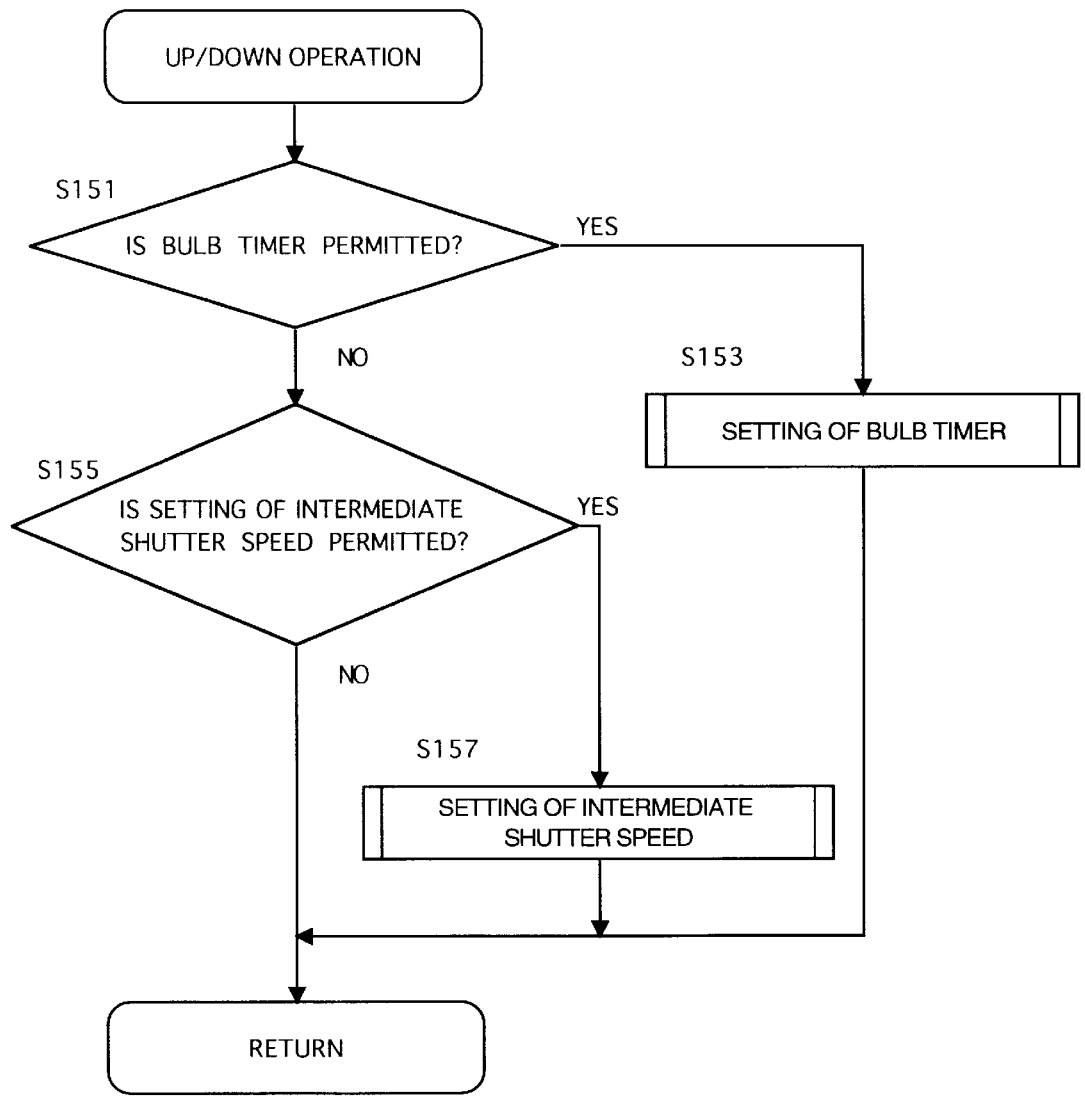
FIG. 8 shows a flow chart of an up-down operation of a single lens reflex camera shown in FIG. 1, by way of example.

The up-down operation at step Slll will be described below with reference to FIG. 8.

In the up-down operation, a check is made to determine whether the bulb timer setting is permitted, whether the bulb timer is permitted, and whether the intermediate shutter speed setting is permitted. If the bulb timer setting is permitted, the bulb timer setting is carried out (S151, Y; S153). If the intermediate shutter speed setting is permitted, an intermediate shutter speed setting is carried out (S151, N; S155, Y; S157).

Figure 9:
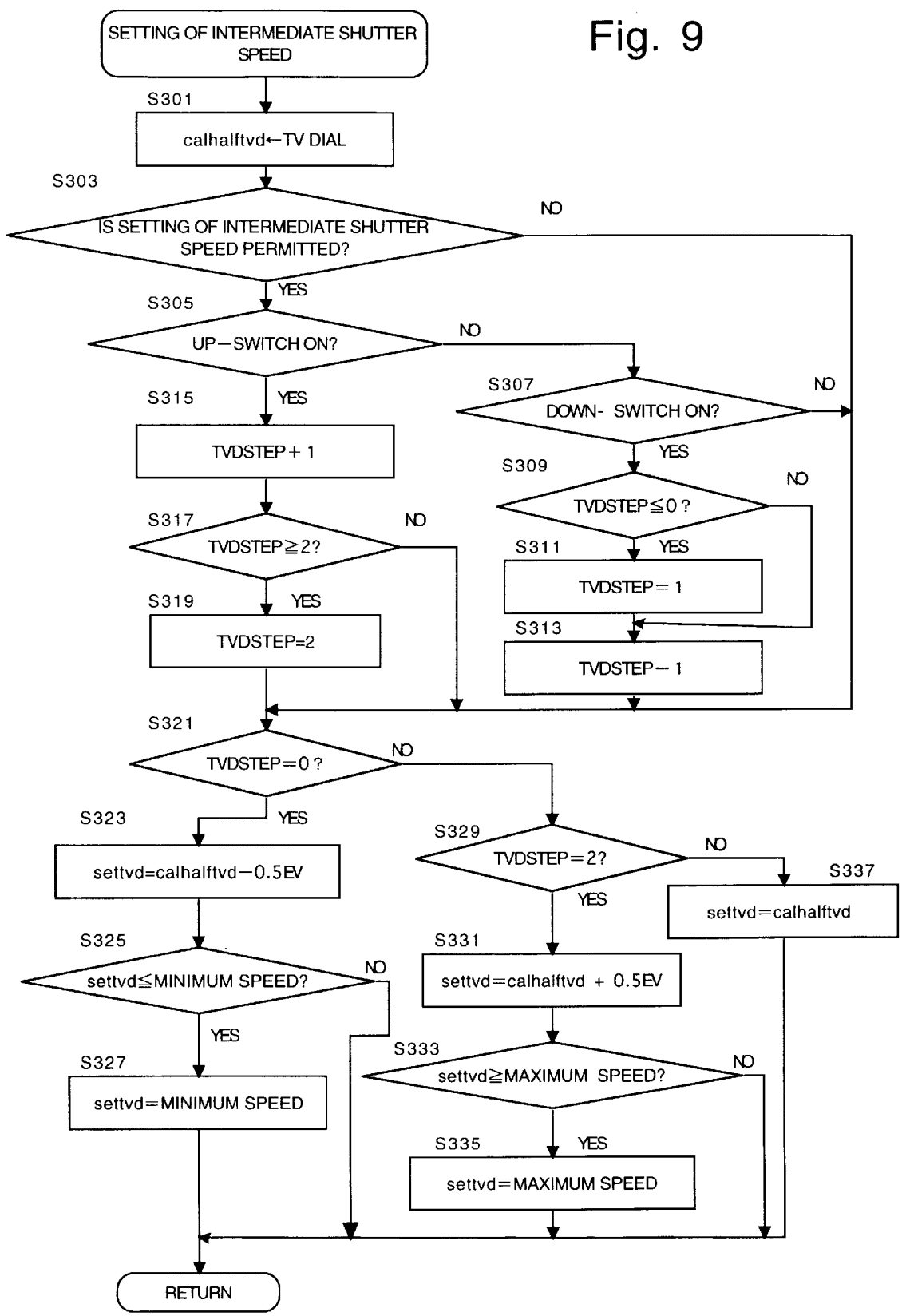
FIG. 9 shows a flow chart of an intermediate shutter speed setting operation of a single lens reflex camera shown in FIG. 1, by way of example.

The intermediate shutter speed setting operation at step S157 will be described in more detail below with reference to FIG. 9.

In the intermediate shutter speed setting operation, an intermediate shutter speed which cannot be set by the shutter speed setting-dial 17 is set when the shutter speed setting-dial 17 is stopped at any shutter speed setting-position; i.e., when the shutter speed is set to manual. In the illustrated embodiment, the shutter speed which has been set in accordance with the shutter speed setting-position of the shutter speed setting-dial 17 can be modified by a step half of which the shutter speed can be normally set thereby at the setting-position. Namely, the shutter speed Tv set by the shutter speed setting-dial 17 can be manually modified by ±0.5 step (±0.5 Ev (Tv)). Note that the CPU 51 detects the stop position of the shutter speed setting-dial 17 based on the state of the Tv dial switch 57 input through the DPU 53.

In the intermediate shutter speed setting operation, the shutter speed corresponding to the stop position of the shutter speed setting-dial 17 is set to the dial-set shutter speed calhalftvd (S301). Thereafter, a check is made to determine whether the intermediate shutter speed setting is permitted. If the intermediate shutter speed setting is permitted, the control proceeds onto steps S305 through S319; if the shutter speed setting is not permitted, the control skips steps S305 through S319 and proceeds to step S321 (S303, Y; S305 to S319; S321) or (S303, N; S321).

If the intermediate shutter speed setting is permitted, a check is made to determine whether or not the up-switch button 23 or the down-switch button 24 is depressed (whether or not the up-switch 59 or the down switch 60 is turned ON) (S305, S307). If the up-switch 59 is ON, the dial step TVDSTEP is increased by one increment (S305, Y; S315). A check is made to determine whether or not the dial step TVDSTEP is 2 or more. If the dial step TVDSTEP is 2 or more, the dial step TVDSTEP is set to 2 (S3l7, Y; S319). If the dial step TVDSTEP is less than 2, the control proceeds to step S321 (S317, N; S321).

If the up switch 59 is not turned ON, a check is made to determine whether or not the down switch 60 is turned ON (S305, N; S307). If the down switch 60 is turned ON, a check is made to determine whether or not the dial step TVDSTEP is less than or equal to 0. If the dial step TVDSTEP is less than or equal to 0, the dial step TVDSTEP is set to 1. Thereafter, one is subtracted from the dial step TVDSTEP and the control proceeds to step S321 (S307, Y; S309, Y; S311; S313; S321). If the dial step TVDSTEP is more than 0, one is subtracted from the dial step TVDSTEP and the control proceeds to step S321 (S309: N, S313, S321). Note that the dial step TVDSTEP is a reduced value to facilitate the shutter speed modification operation. The dial step TVDSTEP "0" corresponds to −0.5 Ev, "1" corresponds to ±0 Ev, and "2" corresponds to +0.5 Ev.

If neither the up switch 59 nor the down switch 60 are turned ON, the control skips steps S309 to S319 and proceeds to step S321 (S305, N; S307, N; S321).

In the operations beginning at step S321, the value set in the dial step TVDSTEP is converted to an Ev value, wherein the set shutter speed settvd can be modified thereby. At step S321, a check is made to determine whether or not the dial step TVDSTEP is 0. If the dial step TVDSTEP is 0, the value which is obtained by subtracting 0.5 Ev from the dial-set shutter speed calhalftvd is set as the set shutter speed settvd (S321, N; S323). A check is made to determine whether or not the set shutter speed settvd is below the minimum shutter speed of the camera. If the set shutter speed settvd is below the minimum shutter speed of the camera, the set shutter speed settvd is set to the minimum shutter speed and thereafter the control is returned (S325, Y; S327). If the set shutter speed settvd is not below the minimum shutter speed of the camera, the control is directly returned (S325, N).

If the dial step TVDSTEP is not 0, a check is made to determine whether the dial step TVDSTEP is 2. If the dial step TVDSTEP is 2, +0.5 Ev is added to the set shutter speed settvd (S329, Y; S331). If the set shutter speed settvd is above the maximum shutter speed of the camera, the set shutter speed settvd is set to the maximum shutter speed and thereafter the control is returned (S333, Y; S335). If the set shutter speed settvd is not above the maximum shutter speed of the camera, the control is directly returned (S333, N).

If the dial step TVDSTEP is not 0 or 2 (i.e. TVDSTEP is 1), the set shutter speed settvd is set to be identical to the dial-set shutter speed calhalftvd and the control is thereafter returned (S321, N; S329, N; S327). Note that the initial value of the dial step TVDSTEP is 1; set at step S101 (of FIG. 3) upon the initialization operation.

If the shutter speed is set by the shutter speed setting-dial 17 in the above mentioned operations, an intermediate shutter speed between the shutter speeds which can be set by the shutter speed setting-dial 17 can be set by the up-switch 59 and the down switch 60.

The shutter speed set by the shutter speed setting-dial 17 and the intermediate shutter speed modified by the up switch 59 and the down switch 60 are indicated in one or both of the external LCD 25 and the internal LCD 26 of the finder. A photographer can learn the actually set shutter speed through the indication in the LCDs 25 and 26. The indication of the shutter speed is optional. For example, the shutter speed set by the shutter speed setting-dial 17 and the intermediate shutter speed are represented by + and −, respectively; alternatively, it is also possible to indicate the actual set shutter speed.

Figure 10:
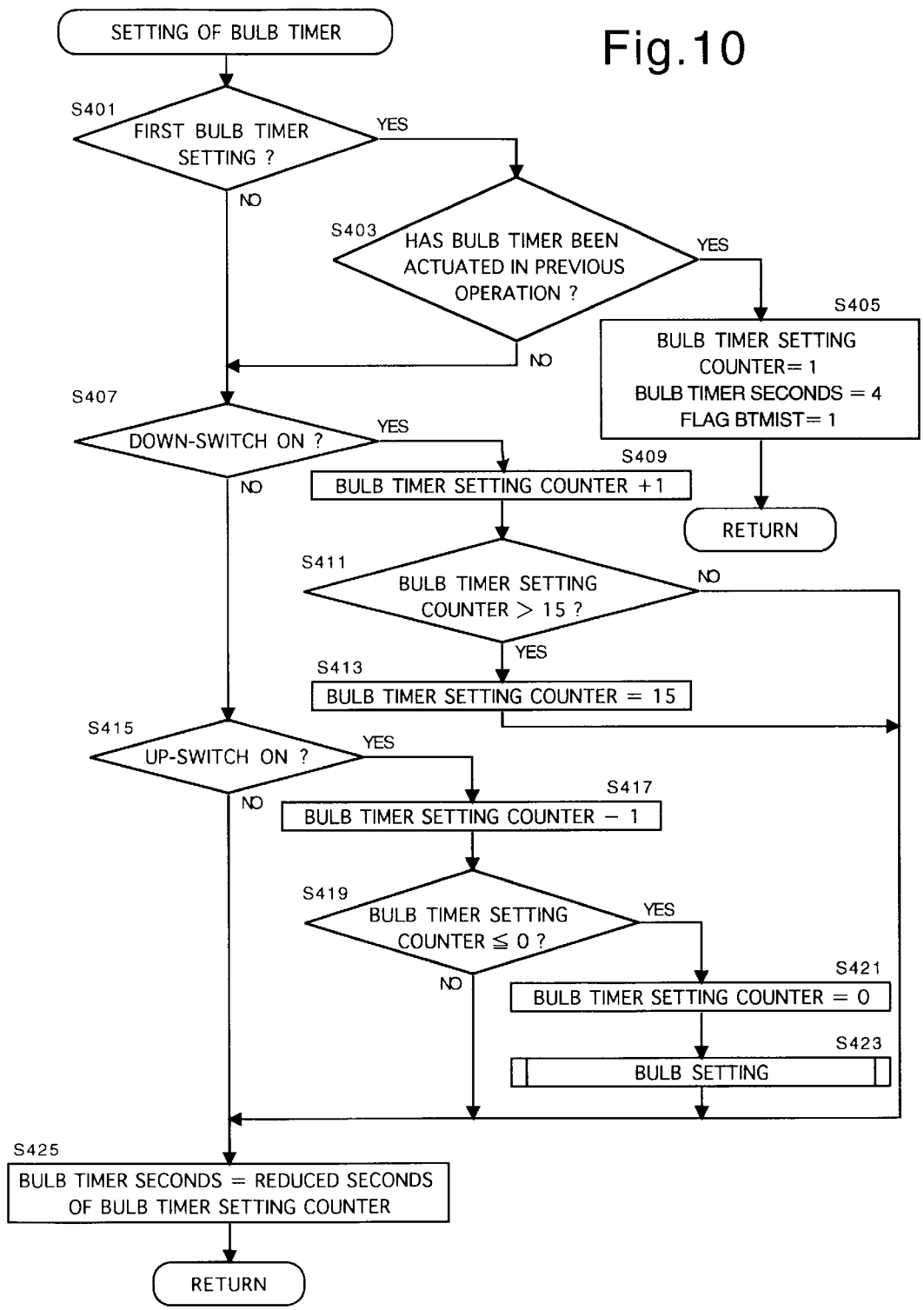
FIG. 10 shows a flow chart of a bulb timer setting operation of a single lens reflex camera shown in FIG. 1, by way of example.

The bulb timer setting operation will be discussed below with reference to FIG. 10.

In the bulb timer setting operation, the exposure time at the bulb mode is set. The exposure time is selected from among a plurality of predetermined exposure times in accordance with the operation of the up-switch button 23 and the down switch button 24. The bulb timer setting operation is carried out when the shutter speed setting-dial 17 is in the bulb position B, in which the exposure time at the bulb mode can be set to manual using the up and down switch buttons. Note that when the shutter speed setting-dial 17 is set in the bulb position B, the normal bulb mode is set. In this state, when the up-switch button 23 or the down switch button 24 is actuated, the bulb timer (exposure time) can be selected.

In the bulb timer setting operation, a check is made to determine whether the bulb timer setting is the first setting and whether the bulb timer was not actuated in the previous operation. If the bulb timer setting is the first setting and the bulb timer was not actuated in the previous operation, the initial value of the bulb timer is set; i.e., the bulb timer setting counter is set to 1, the bulb timer is set to 4 (seconds); and Flag BTM1ST is set to 1. Note that Flag BTM1ST is for determining whether or not the bulb timer mode has been entered into first; wherein the initialized state for Flag BTM1ST is "Clear" (zero). Accordingly, at step S401, a check is made to determine whether or not Flag BTM1ST is equal to zero. If Flag BTM1ST is equal to zero, control proceeds to step S403; otherwise, if Flag BTM1ST is equal to 1 (i.e. if step S405 has been passed through once), the control proceeds to step S407. Thereafter, the control is returned (S401, Y; S405). Consequently, the shutter speed, i.e. the exposure time, is set at 4 seconds.

If the bulb timer setting is not the first setting or even if the bulb timer setting is the first setting, if the bulb timer was actuated in the previous operation, the control proceeds to step S407 (S401, N; S407) or (S401, Y; S403, N; S407). At step S407, a check is made to determine whether or not the down-switch 60 is ON. If the down switch 60 is not ON, a check is made to determine whether or not the up-switch 60 is ON. If neither the down-switch 60 nor the up-switch 59 are ON, the reduced seconds of the bulb setting counter are set in the bulb timer (seconds). Thereafter, the control is returned (S401, N; S407, N; S415, N; S425).

If the down-switch 60 is ON, 1 is added to the value of the bulb timer setting counter (S407, Y; S409). Thereafter, a check is made to determine whether the value of the bulb timer setting counter is above 15. If the value of the counter is less than or equal to 15, the control proceeds to step S425 (S411, N; S425). If the value of the counter is above 15, the bulb timer setting counter is set to 15 and the control proceeds to step S425 (S411, Y; S413; S425).

If the up-switch 59 is ON, 1 is subtracted from the bulb timer setting counter (S415, Y; S417). Thereafter, a check is made to determine whether the bulb timer setting counter is less than or equal to 0. If the bulb timer setting counter is greater than 0, the control proceeds to step S425 (S419, N; S425). If the bulb timer setting counter is less than or equal to 0, the bulb timer setting counter is set to 0, and the bulb setting operation is carried out; thereafter, the control proceeds to step S425 (S419, Y; S421; S423).

At step S425, the value of the bulb timer setting counter is converted to seconds, and the converted seconds are set in the bulb timer. In the illustrated embodiment, the bulb timer (seconds) is set at ½ Ev steps. The relationship between the value of the bulb timer setting counter and the bulb timer (seconds) is as follows:

counter 0 1 2 3 4 5 6 7 8 9 10 11 12 13 14 15
seconds 0 4 6 8 10 15 20 30 45 60 90 125 180 250 350 500

Note that the set bulb timer seconds are indicated in either the external LCD 25 or the internal LCD 26 of the finder or in both thereof.

Figure 11:
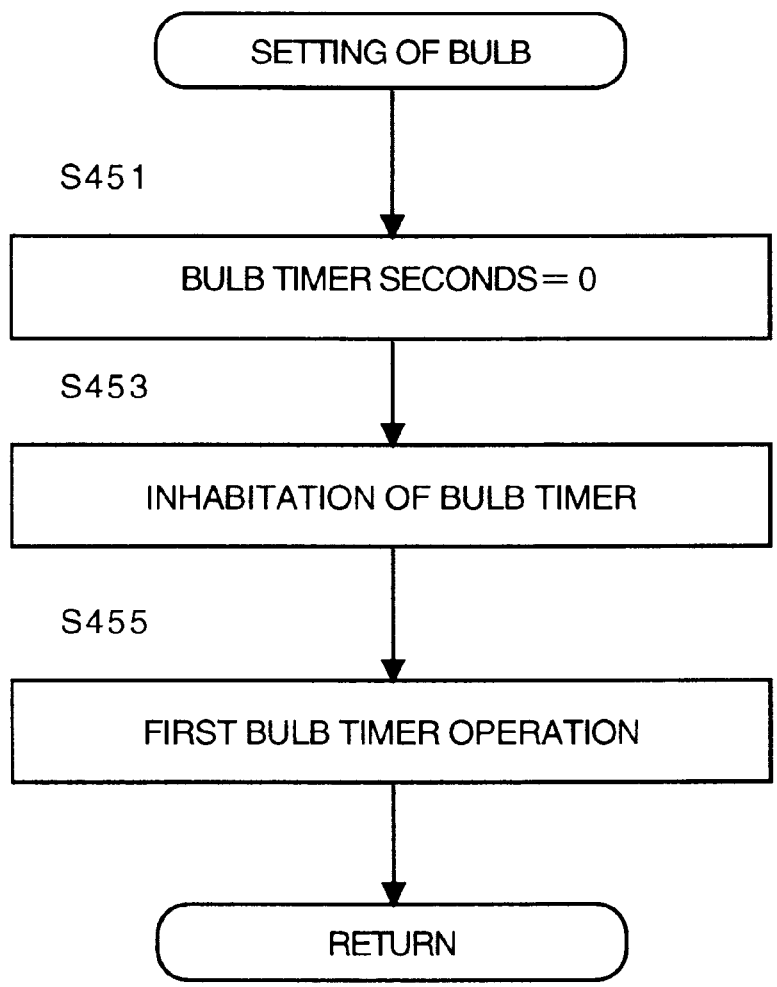
FIG. 11 shows a flow chart of a bulb setting operation of a single lens reflex camera shown in FIG. 1, by way of example.

In the bulb setting operation at step S423, as can be seen in the flow chart of FIG. 11, the bulb timer (seconds) is set to 0; the bulb timer is inhibited; the first bulb timer setting operation is set; and the control is returned (S451, S453, S455). Through the bulb setting operation, upon releasing, the normal bulb mode is set in which the shutter is opened while the release button 21 is depressed by a full step (release switch SWR is ON).

In the bulb timer setting operation mentioned above, if the shutter speed setting-dial 17 is in the bulb position B, the exposure time can be set in the range of 4 seconds to 500 seconds by the operation of the up-switch 23 and/or the down-switch 24. The exposure times which can be set are not limited to those obtained at the ½ Ev step in the illustrated embodiment, and can be, for example, those obtained at a ⅓ Ev step or 1 second units.

Although the shutter speed which has been set in accordance with the stop position of the shutter speed setting-dial 17 is modified by a value corresponding to ±½ Ev in the illustrated embodiment, it is possible to modify the shutter speed by a value by ±⅔ Ev at a ±⅓ Ev step. The range of the shutter speed which can be modified can be more than ±1 Ev.

As may be understood from the above discussion, according to an aspect of the present invention, one of the plural shutter speeds which are set at a predetermined step is selected in accordance with the stop position of the first switch and the shutter speed thus selected can be modified at a step smaller than the above-mentioned predetermined step by the second switch. Consequently, a preliminary shutter speed is first mechanically set by the first switch and an accurate shutter speed (which cannot be set by the first switch) can be set by the second switch. Thus, fine setting of the shutter speeds can be carried out without increasing the number of the mechanical switches or switch contacts.

According to another aspect of the present invention, if the bulb is selected by the first switch, the exposure time can be selected in place of the bulb, by the operation of the second switch. Thus, the exposure time (slow shutter) can be easily set without increasing the number of the mechanical switches or switch contacts.

In the present invention, settings for exposure factors such as diaphragm values and shutter speeds can be accurately set. However, the shutter speed is more frequently set; and furthermore, it is preferable that the shutter speed setting-dial be utilized.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A setting apparatus for a camera comprising:
    a first switch having a plurality of stop positions, each of said plurality of stop positions defining a complete shutter speed;
    a second switch; and
    a shutter speed setting device which can select a desired shutter speed from a plurality of shutter speeds set at predetermined steps in accordance with said stop positions of said first switch;
    wherein said shutter speed setting device can modify said shutter speed, which has been selected by said stop positions of said first switch, by a step smaller than said predetermined steps via the operation of said second switch.

2. A setting apparatus for a camera according to claim 1, wherein said first switch comprises a rotary switch which can be selectively stopped at a plurality of click-stop positions, and wherein said shutter speed setting device detects said click-stop position of said rotary switch to thereby carry out the selection thereof in accordance with said detected click-stop position.

3. A setting apparatus for a camera according to claim 2, wherein the data selected and obtained at said click-stop position of said first switch is indicated on the operation portion of said first switch in a camera body.

4. A setting apparatus for a camera according to claim 1, wherein said second switch comprises an up-switch which is adapted to modify and increase said shutter speed, and a down-switch which is adapted to modify and decrease said shutter speed.

5. A setting apparatus for a camera according to claim 1, wherein said shutter speed corresponding to said predetermined step is equivalent to the absolute value of 1 Ev.

6. A setting apparatus for a camera according to claim 5, wherein said shutter speed corresponding to said smaller step is equivalent to an absolute value of ½ Ev.

7. A setting apparatus for a camera according to claim 5, wherein said shutter speed corresponding to said smaller step is equivalent to an absolute value of ⅓ Ev.

8. A setting apparatus for a camera comprising:
    a first switch having a plurality of stop positions;
    a second switch; and
    a shutter speed setting device which can select a shutter speed or a bulb from a plurality of shutter speeds set at predetermined steps in accordance with said stop positions of said first switch; wherein said shutter speed setting device can set a shutter speed slower than said shutter speed instead of said bulb, said bulb having been selected via said stop positions of said first switch, via the operation of said second switch.

9. A setting apparatus for a camera according to claim 8, wherein said first switch comprises a rotary switch which can be selectively stopped at a plurality of click-stop positions, and wherein said shutter speed setting device detects said click-stop position of said rotary switch to thereby carry out the selection thereof in accordance with said detected click-stop position.

10. A setting apparatus for a camera according to claim 8, wherein the data selected and obtained at said click-stop position of said first switch is indicated on the operation portion of said first switch in a camera body.

11. A setting apparatus for a camera according to claim 8, wherein said second switch is comprised of an up-switch which is adapted to modify and increase said shutter speed, and a down-switch which is adapted to modify and decrease said shutter speed.

12. A setting apparatus for a camera according to claim 8, wherein said shutter speed corresponding to said predetermined step is equivalent to the absolute value of 1 Ev.

13. A setting apparatus for a camera according to claim 12, wherein said shutter speed corresponding to said smaller step is equivalent to an absolute value of ½ Ev.

14. A setting apparatus for a camera according to claim 12, wherein said shutter speed corresponding to said smaller step is equivalent to an absolute value of ⅓ Ev.

15. A setting apparatus for a camera comprising:
    a first switch having a plurality of stop positions;
    a second switch; and
    a shutter speed setting device for selecting a shutter speed or a bulb from a plurality of shutter speeds set at a predetermined step in accordance with said stop positions of said first switch;
    wherein said shutter speed setting device can modify said shutter speed, which has been selected via said stop positions of said first switch, by a step smaller than said predetermined steps via the operation of said second switch; and
    wherein said shutter speed setting device can set a shutter speed slower than said shutter speed instead of said bulb, said bulb having been selected via said stop positions of said first switch, via the operation of said second switch.

16. A setting apparatus for a camera according to claim 15, wherein said first switch comprises a rotary switch which can be selectively stopped at a plurality of click-stop positions, and wherein said shutter speed setting device detects said click-stop position of said rotary switch to thereby carry out the selection thereof in accordance with said detected click-stop position.

17. A setting apparatus for a camera according to claim 15, wherein the data selected and obtained at said click-stop position of said first switch is indicated on the operation portion of said first switch in a camera body.

18. A setting apparatus for a camera according to claim 15, wherein said second switch is comprised of an up-switch which is adapted to modify and increase said shutter speed, and a down-switch which is adapted to modify and decrease said shutter speed.

19. A setting apparatus for a camera according to claim 18, wherein said shutter speed corresponding to said predetermined step is equivalent to the absolute value of 1 Ev.

20. A setting apparatus for a camera according to claim 18, wherein said shutter speed corresponding to said smaller step is equivalent to an absolute value of ½ Ev.

21. A setting apparatus for a camera according to claim 18, wherein said shutter speed corresponding to said smaller step is equivalent to an absolute value of ⅓ Ev.

22. A setting apparatus for a camera comprising:

a first switch having a plurality of stop positions;

a second switch said second switch being manually rendered operable and inoperable; and an exposure factor setting device which can select desired photographing conditions from a plurality of exposure factors in accordance with said stop positions of said first switch;

wherein said exposure factor setting device can modify said exposure factor, which has been selected via said stop positions of said first switch, by a step smaller than an interval between said stop positions via the operation of said second switch.

23. The setting apparatus for a camera according to claim 22, wherein, when said second switch is operable, an interval between stop positions of said first switch is decreased.

24. The setting apparatus for a camera according to claim 22, wherein, when said second switch is operated, said exposure factor setting device at least one of increases and decreases a shutter speed set by said first switch via a step smaller than an interval between each of said plurality of stop positions of said first switch.

25. The setting apparatus for a camera according to claim 22, said exposure factor setting device comprising a shutter speed setting device which can select a desired shutter speed from a plurality of shutter speeds set at predetermined steps in accordance with said stop positions of said first switch, said shutter speed setting device being capable of modifying said shutter speed which has been selected via said stop positions of said first switch, via steps smaller than said predetermined steps via the operation of said second switch.

26. The setting apparatus for a camera according to claim 22, wherein said first switch comprises a rotary switch which can be selectively stopped at a plurality of click-stop positions, and wherein said exposure factor setting device detects said click-stop position of said rotary switch to thereby carry out a position selection in accordance with said detected click-stop position.

27. The setting apparatus for a camera according to claim 22, wherein data selected and obtained at said click-stop position of said first switch is indicated on an operation portion of said first switch in a camera body.

28. The setting apparatus for a camera according to claim 22, wherein said second switch comprises an up-switch which is adapted to modify and increase said exposure factor, and a down-switch which is adapted to modify and decrease said exposure factor.

29. The setting apparatus for a camera according to claim 22, wherein said exposure factor comprises a shutter speed, and said shutter speed corresponding to said predetermined step is equivalent to the absolute value of 1 Ev.

30. The setting apparatus for a camera according to claim 22, wherein said exposure factor comprises a shutter speed, and said shutter speed corresponding to said smaller step is equivalent to an absolute value of ½ Ev.

31. The setting apparatus for a camera according to claim 22, wherein said exposure factor comprises a shutter speed, and said shutter speed corresponding to said smaller step is equivalent to an absolute value of ⅓ Ev.

* * * * *